(12) United States Patent
Foster

(10) Patent No.: US 9,746,379 B2
(45) Date of Patent: Aug. 29, 2017

(54) COOLING SYSTEMS FOR IMAGING DEVICES

(71) Applicant: Sensors Unlimited, Inc., Princeton, NJ (US)

(72) Inventor: John T. Foster, Morrisville, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 14/992,476

(22) Filed: Jan. 11, 2016

(65) Prior Publication Data

US 2017/0199081 A1    Jul. 13, 2017

(51) Int. Cl.
*G01J 5/06* (2006.01)
*G01J 5/00* (2006.01)
*G02B 19/00* (2006.01)

(52) U.S. Cl.
CPC ............. *G01J 5/061* (2013.01); *G01J 5/0014* (2013.01); *G02B 19/009* (2013.01)

(58) Field of Classification Search
CPC ........ G01J 5/061; G01J 5/0014; G02B 19/009
See application file for complete search history.

(56) References Cited

U.S. PATENT DOCUMENTS

| | | | |
|---|---|---|---|
| 5,811,808 A * | 9/1998 | Cannata | ................... G01J 5/22 250/332 |
| 7,495,220 B2 | 2/2009 | Blackwell et al. | |
| 2013/0192275 A1 | 8/2013 | Loung et al. | |
| 2014/0311166 A1 | 10/2014 | Buelow et al. | |

* cited by examiner

*Primary Examiner* — Mark R Gaworecki
(74) *Attorney, Agent, or Firm* — Locke Lord LLP; Daniel J. Fiorello; Joshua L. Jones

(57) ABSTRACT

An imaging assembly includes a base member defining an expansion chamber therein, the base member defining a gas inlet for receiving a compressed gas and a gas outlet for expelling expanded gas, and a focal plane array assembly mounted to the base member including a sensor and a lens.

15 Claims, 4 Drawing Sheets

COOLING SYSTEMS FOR IMAGING DEVICES

BACKGROUND

1. Field

The present disclosure relates to focal plane arrays, more specifically to cooling systems for focal plane arrays.

2. Description of Related Art

Certain imaging devices (e.g., infrared focal plane arrays (IR-FPAs)) exhibit improved quantum efficiency as their operating temps lowered. In practice, operating temps are typically regulated using a thermoelectric cooler. Due to the increased system power draw of the thermoelectric cooler, operating temperatures of infrared imagers are typically maintained at room temperature, instead of a lower temp exhibiting a higher efficiency. Additionally, failure rates of IR-FPAs are higher in shock & vibrational environments due to the fragile nature of thermoelectric coolers.

Such conventional methods and systems have generally been considered satisfactory for their intended purpose. However, there is still a need in the art for improved cooling systems for imaging devices. The present disclosure provides a solution for this need.

SUMMARY

An imaging assembly includes a base member defining an expansion chamber therein, the base member defining a gas inlet for receiving a compressed gas and a gas outlet for expelling expanded gas, and a focal plane array assembly mounted to the base member including a sensor and a lens.

The gas inlet can define a canister receiver for receiving a neck portion of a gas canister. The gas inlet can include a neck extending from the expansion chamber to the canister receiver.

The gas outlet can include a plurality of outlet holes defined in a side of the base member. The plurality of outlet holes can be defined on an opposite side of the base member relative to the gas inlet.

The base member can include internal webbing disposed within the expansion chamber for defining a gas expansion path. The internal webbing can define an alternating path that routes expanding gas between opposing boundaries of the expansion chamber to maximize travel time through the base member.

The base member can include at least one through hole for receiving a port (e.g., an electrical and/or data port) of the focal plane array assembly.

In accordance with at least one aspect of this disclosure, a system includes an imaging assembly as described above. In certain embodiments, the system can include a $CO_2$ gas canister operatively connected to the canister receiver.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
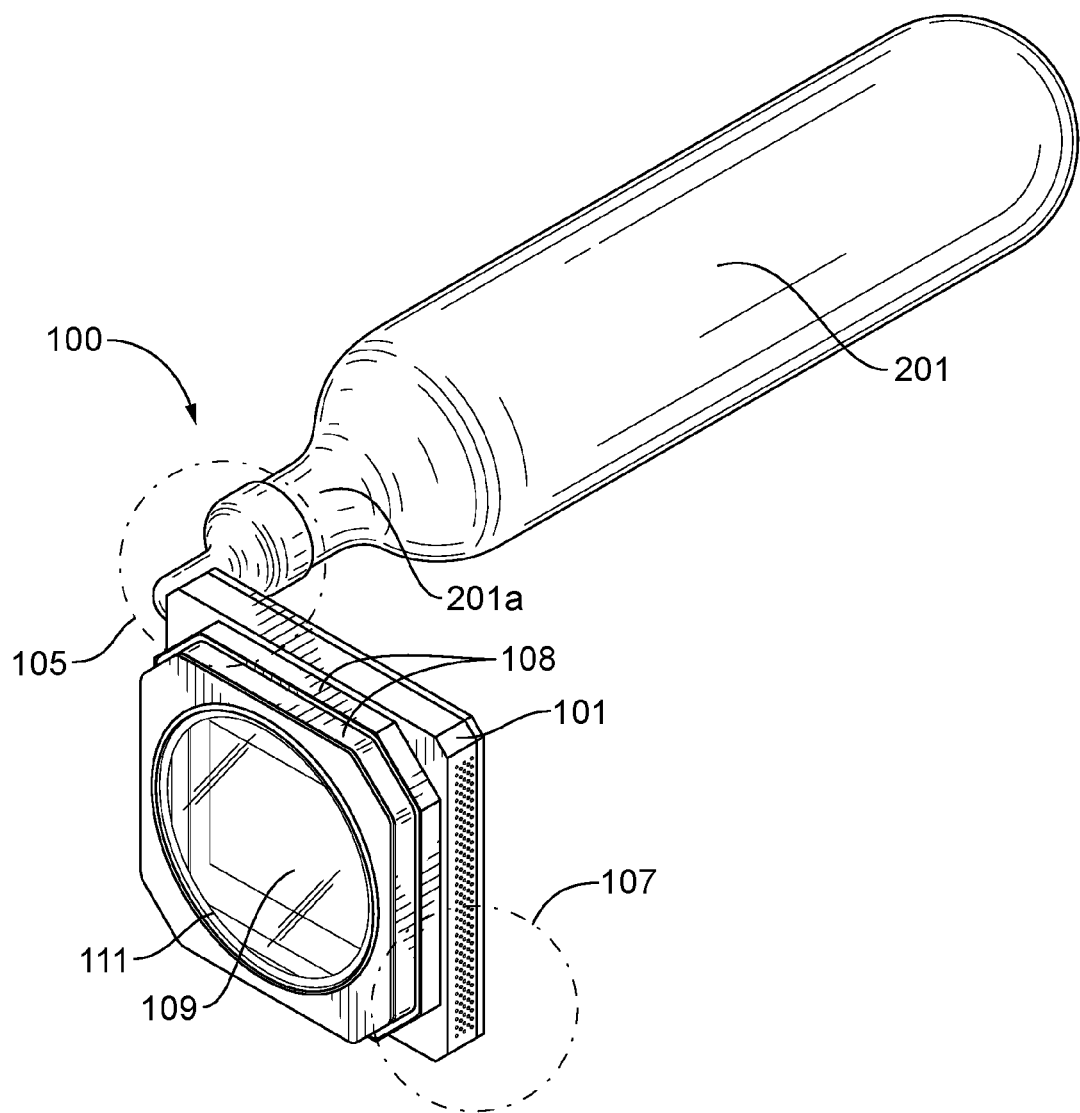
FIGS. 1A-1C are perspective views of an embodiment of an imaging assembly in accordance with this disclosure, showing a $CO_2$ cartridge attached to a base member of the imaging assembly.
Figure 1B:
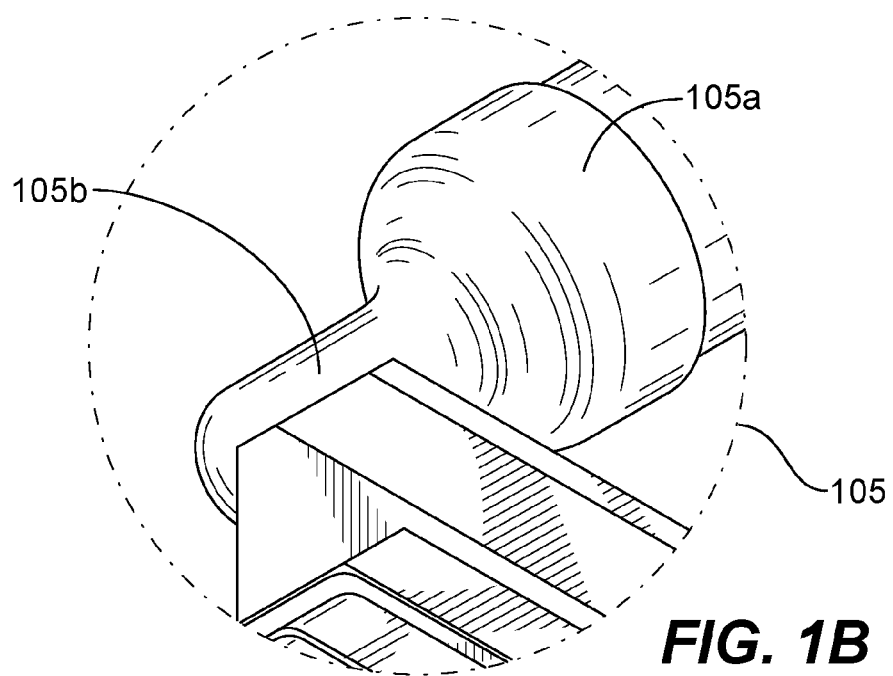
Figure 1C:
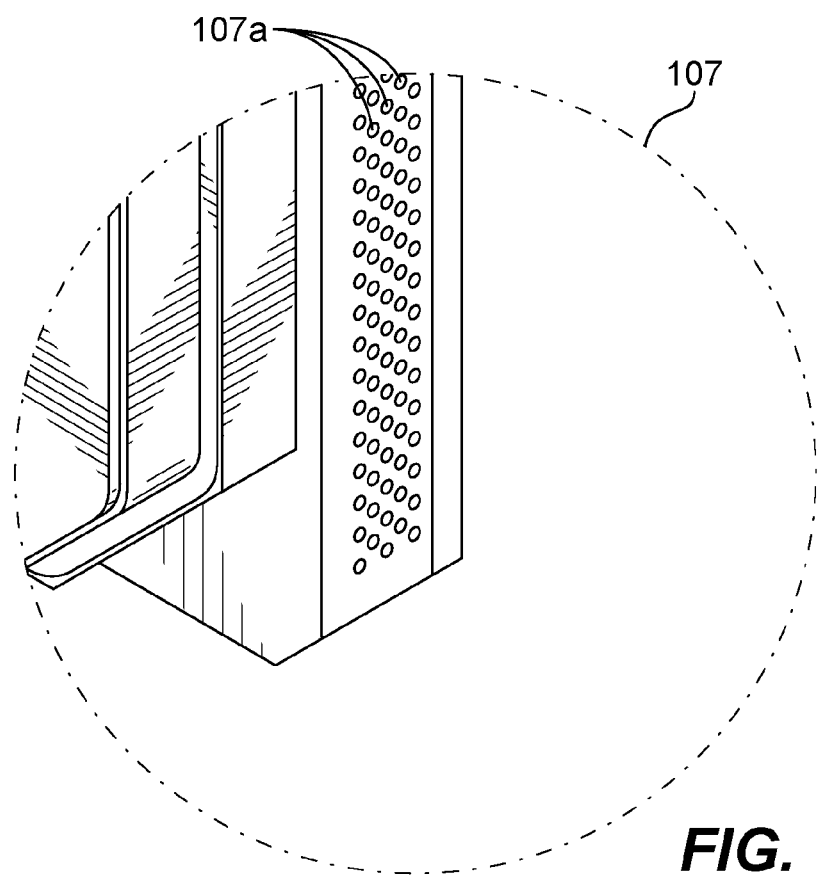
Figure 2A:
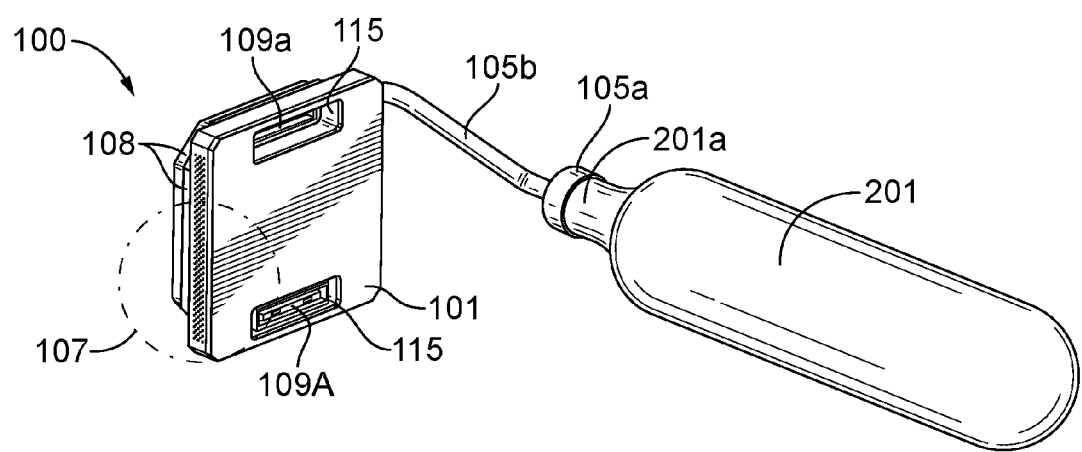
FIGS. 2A and 2B are rear perspective views of the imaging assembly of FIG. 1A.
Figure 2B:
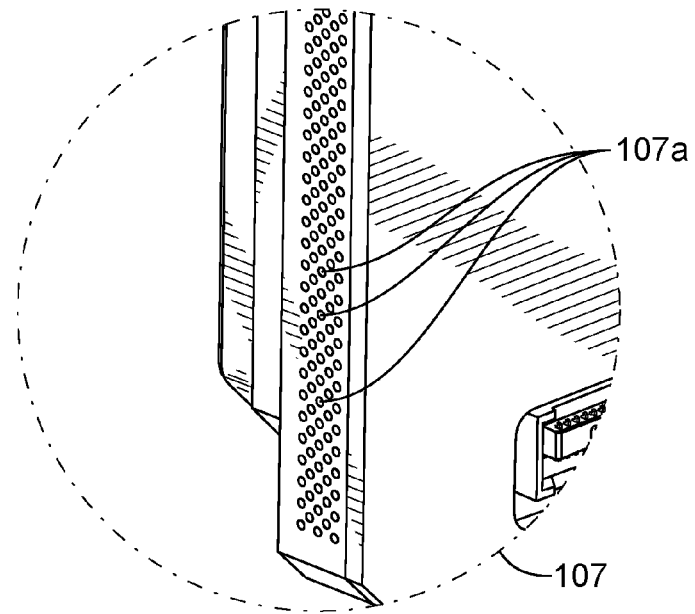
Figure 3:
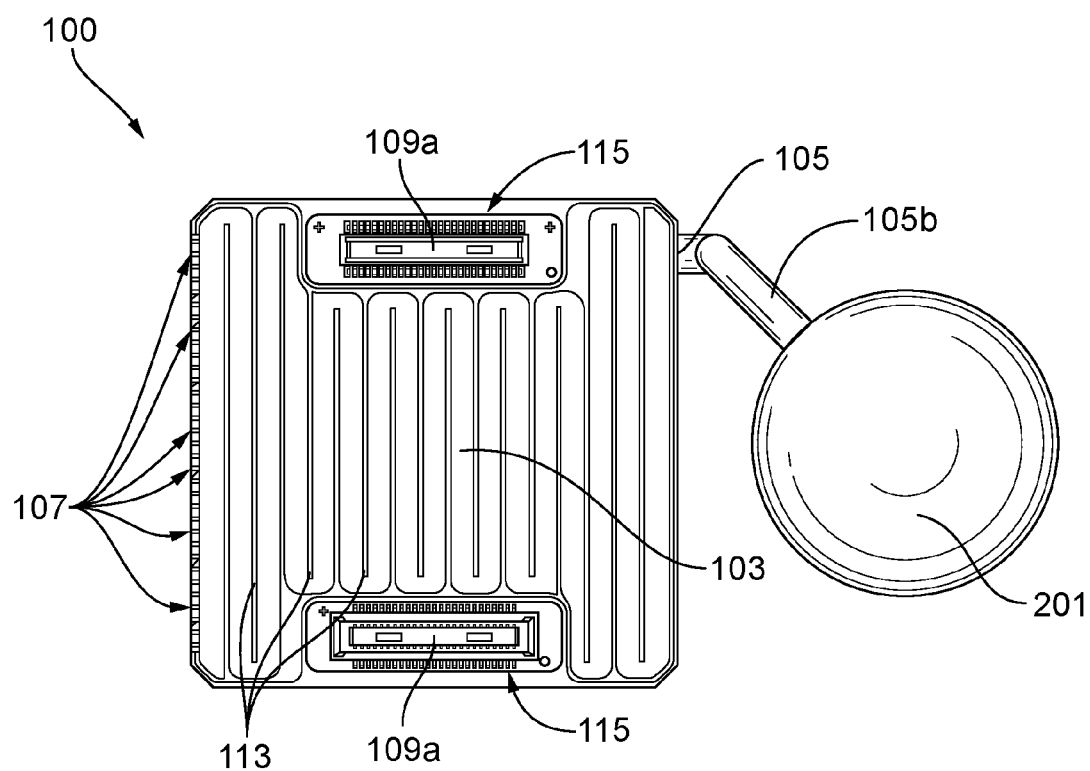
FIG. 3 is a cross-sectional view of the base member of the imaging assembly of FIG. 1A.

Reference will now be made to the drawings wherein like reference numerals identify similar structural features or aspects of the subject disclosure. For purposes of explanation and illustration, and not limitation, an illustrative view of an embodiment of an imaging assembly in accordance with the disclosure is shown in FIGS. 1A-1C and is designated generally by reference character 100. Other embodiments and/or aspects of this disclosure are shown in FIGS. 2A-3. The systems and methods described herein can be used to thermally regulate imaging assemblies (e.g., focal plane arrays).

Referring generally to FIGS. 1A-3, an imaging assembly 100 includes a base member 101 defining an expansion chamber 103 therein (e.g., as shown in FIG. 3). The base member 101 defines a gas inlet 105 for receiving a compressed gas. The base member 101 also defines a gas outlet 107 for expelling expanded gas. The base member 101 can be constructed in any suitable manner (e.g., a two-piece assembly, a monolithic structure made via additive manufacturing).

The imaging assembly 100 can include a focal plane array assembly 108 mounted to the base member 101. The focal plane array assembly 108 can include a sensor 109 (e.g., for imaging electromagnetic radiation such as infrared, visible, and/or any other suitable spectrum). The focal plane array assembly 108 can also include a lens 111 for focusing radiation to the sensor 109.

The gas inlet 105 can define a canister receiver 105a for receiving a neck portion 201a of a gas canister 201 (e.g., $CO_2$ cartridge, a $N_2$ cartridge, or any other suitable compressed gas/source). The gas inlet 105 can include a neck 105b extending from the expansion chamber 103 to the canister receiver 105a.

While not shown, a suitable valve can be connected between the gas canister 201 and the expansion chamber 103 for selectively metering fluid from the gas canister 201. For example, the valve can be connected to a suitable controller and can allow for constant flow of gas from the canister, no flow, and/or any other suitable changing flow and/or intervals of flow (e.g., bursts for periods of time where high sensitivity and/or operational efficiency is desired).

The gas outlet 107 can include a plurality of outlet holes 107a defined in a side of the base member 101. As shown, the plurality of outlet holes 107a can be defined on an opposite side of the base member 101 relative to the gas inlet 105. Such an embodiment requires the gas to travel all the way through the entire expansion chamber 103 for maximizing dwell time of the gas in the expansion chamber 103.

As shown in FIG. 3, the base member can include internal webbing 113 disposed within the expansion chamber 103 for defining a gas expansion path. The internal webbing 113 can define an alternating path (e.g., a parallel winding path as shown) that routes expanding gas between opposing boundaries of the expansion chamber to maximize travel time through the base member 101. Any other suitable internal webbing 113 and/or gas expansion path is contemplated herein.

Referring to FIGS. 2 and 3, the base member 101 can include at least one through hole 115 for receiving a port 109a (e.g., an electrical and/or data port) of the focal plane array assembly 108. Any other suitable through-holes, mounting holes, indents and/or the like are contemplated herein.

As described hereinabove, the assembly 100 can replace thermoelectric coolers by using a compressed gas canister 201 (e.g., a disposable 12 grams $CO_2$ cartridge) instead. Waste heat of the focal plane array assembly 108 is removed both through expansion of the gas and through phase change of the compressed gas (e.g., $CO_2$ which is a liquid @ 800 kPa in the cartridge). In the case of $CO_2$, the evaporation and expansion of 12 grams of $CO_2$ will absorb about 7100 Jules of waste heat under ideal conditions, which is about the equivalent to the waste heat of a 500 mW device over the course of 4 hours.

Certain benefits of embodiments as disclosed hereinabove over traditional thermoelectric coolers include 1) immunity to the vibe forces that result in thermoelectric cooler failure, which can be a major concern in weapon shock applications, 2) no electrical power is required which reduces power draw, and 3) much lower temperatures can be achieved much faster than a single stage thermoelectric cooler for a given volume, enabling bursts of very high sensitivity operation when needed. Another benefit is that certain gas cartridges are inexpensive and reduce the cost/maintenance expense of the entire system.

The methods and systems of the present disclosure, as described above and shown in the drawings, provide for imaging assemblies with superior properties including improved cooling, reduced weight, and reduced cost. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. An imaging assembly, comprising: a base member defining an expansion chamber therein, the base member defining a gas inlet for receiving a compressed gas and a gas outlet for expelling expanded gas; and a focal plane array assembly mounted to the base member including a sensor and a lens, wherein the base member includes internal webbing disposed within the expansion chamber for defining a gas expansion path.

2. The imaging assembly of claim 1, wherein the gas inlet defines a canister receiver for receiving a neck portion of a gas canister.

3. The imaging assembly of claim 2, wherein the gas inlet includes a neck extending from the expansion chamber to the canister receiver.

4. The imaging assembly of claim 1, wherein the gas outlet includes a plurality of outlet holes defined in a side of the base member.

5. The imaging assembly of claim 4, wherein the plurality of outlet holes are defined on an opposite side of the base member relative to the gas inlet.

6. The imaging assembly of claim 1, wherein the internal webbing defines an alternating path that routes expanding gas between opposing boundaries of the expansion chamber to maximize travel time through the base member.

7. The imaging assembly of claim 1, wherein the base member includes at least one through hole for receiving a port of the focal plane array assembly.

8. A system, comprising: an imaging assembly, comprising: a base member defining an expansion chamber therein, the base member defining a gas inlet for receiving a compressed gas and a gas outlet for expelling expanded gas wherein the gas inlet defines a canister receiver for receiving a neck portion of a gas canister; and a focal plane array assembly mounted to the base member including a sensor and a lens, wherein the base member includes internal webbing disposed within the expansion chamber for defining a gas expansion path.

9. The system of claim 8, further comprising a $CO_2$ gas canister operatively connected to the canister receiver.

10. The system of claim 9, wherein the gas inlet includes a neck extending from the expansion chamber to the canister receiver.

11. The system of claim 8, wherein the gas outlet includes a plurality of outlet holes defined in a side of the base member.

12. The system of claim 11, wherein the plurality of outlet holes are defined on an opposite side of the base member relative to the gas inlet.

13. The system of claim 8, wherein the internal webbing defines an alternating path that routes expanding gas between opposing boundaries of the expansion chamber to maximize travel time through the base member.

14. The system of claim 8, wherein the base member includes at least one through hole for receiving a port of the focal plane array assembly.

15. An imaging assembly, comprising: a base member defining an expansion chamber therein, the base member defining a gas inlet for receiving a compressed gas and a gas outlet for expelling expanded gas; and a focal plane array assembly mounted to the base member including a sensor and a lens, wherein the base member includes at least one through hole for receiving a port of the focal plane array assembly.

* * * * *